United States Patent Office 3,591,684
Patented July 6, 1971

3,591,684
CONTROLLING SOUTHERN ARMYWORM WITH
3-IODO-3',4',5-TRICHLOROSALICYLANILIDE
Jack D. Early, Bethesda, Md., and John P. Chupp, Kirkwood, Mo., assignors to Monsanto Company, St. Louis, Mo.
No Drawing. Original application May 29, 1968, Ser. No. 732,870, now Patent No. 3,541,147, dated Nov. 17, 1970. Divided and this application Feb. 11, 1970, Ser. No. 10,632
Int. Cl. A01n 9/20
U.S. Cl. 424—230                    1 Claim

ABSTRACT OF THE DISCLOSURE

Control of *Prudenia eridania* larvae, commonly known as southern armyworm larvae with 3-iodo-3',4',5-trichlorosalicylanilide.

This application is a division of copending application Ser. No. 732,870 filed May 29, 1968, now U.S. Pat. 3,541,147.

This invention relates to a new compound, specifically 3-iodo-3',4',5-trichlorosalicylanilide

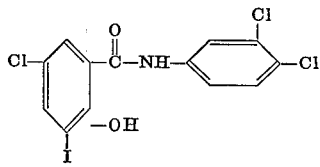

for controlling southern armyworm larvae (*Prodenia eridania*).

The compound of this invention is prepared as follows.

To a suitable reaction vessel equipped with a thermometer, agitator and reflux condenser is added 7.4 parts by weight (substantially 0.25 mole) of 3-iodo-5-chlorosalicylic acid (M.P. 227–228° C.) and approximately 130 parts by weight of dichlorobenzene and the mass heated with agitation up to a temperature in the range of 70–80° C. Thereupon 4.1 parts by weight (substantially 0.25 mole) of 3,4-dichloroaniline is added. While agitating this mass and maintaining the temperature in the range of 80–90° C. approximately 1.3 parts by weight of phosphorus trichloride in approximately 13 parts by weight of dichlorobenzene is added thereto over a period of about 15 minutes. Thereupon the agitating mass is heated up to about 135° C. and maintained at a temperature in the range of 130–140° C. for about 5 hours. The mass is then cooled to below about 100° C. whereupon is added approximately 50 parts by weight of water and approximately 50 parts by weight of 20% hydrochloric acid. The mass is permitted to cool to about 70° C. and agitated for about 15 minutes. The agitation is stopped and the respective liquid layers permitted to separate. The organic liquid layer is separated and washed with water. To the so washed organic liquid layer is added a 10% aqueous sodium bicarbonate solution and the mixture agitated at about 50° C. for about 15 minutes. The organic layer is separated and again washed with water. The so washed organic liquid is then subjected to vacuum distillation to remove the dichlorobenzene and other volatiles. The residue is then recrystallized from benzene to give 3-iodo-3',4',5-trichlorosalicylanilide, colorless needles melting at 184–186° C.

The 3-iodo-5-chlorosalicyclic acid precursor is prepared by adding to a suitable reaction vessel equipped with a thermometer, agitator and reflux condenser 34.4 parts by weight of 5-chlorosalicylic acid and approximately 200 parts by weight of glacial acetic acid. The so charged mass is then heated to about 50° C. and while agitating 33.8 parts by weight of iodine monochloride in approximately 50 parts by weight of glacial acetic acid is added over a period of about 90 minutes, the temperature during the addition rising to about 110° C. The mass is then heated with agitation at a temperature in the range of 110–120° C. for about 2 hours. The mass is cooled and then poured into approximately 200 parts by weight of a 5% aqueous sodium sulfite solution. The mass is permitted to stand at room temperature for several minutes, filtered, and the filter cake dried. The dried filter cake is then recrystallized from glacial acetic acid to give 3-iodo-5-chlorosalicylic acid, a crystalline solid melting at 227–228° C.

In order to demonstrate the unique properties of the salicylanilide of this invention the following salicylanilides were prepared:

(a) 3,3',4',5 - tetrachlorosalicylanilide.—A white solid prepared in accordance with the procedure set forth in U.S. 2,703,332 from a substantially equimolecular mixture of 3,4-dichloroaniline and 3,5-dichlorosalicylic acid in the presence of a dehydrating agent such as thionylchloride or phosphorus trichloride;

(b) 3 - nitro - 3',4',5-trichlorosalicylanilide.—A yellow-brown solid (M.P. 136–137° C.) prepared in accordance with the same procedure of the aforedescribed example for preparing the salicylanilide of this invention but replacing 3-iodo-5-chloro-salicylic acid with an equimolecular proportion of 3 - nitro - 5 - chlorosalicylic acid. This 3-nitro-5-chlorosalicylic acid precursor, a yellow crystalline solid melting at 165–167° C., is prepared by adding to a suitable reaction vessel equipped with a thermometer, agitator the reflux condenser 34.4 parts by weight of 5-chlorosalicylic acid and approximately 200 parts by weight of glacial acetic acid at room temperature. While agitating the mass and maintaining the temperature at about 15° C., approximately 14 parts by weight of 90% nitric acid is slowly added. Upon completion of the nitric acid addition the mass had heated up to a temperature of about 60° C. The mass is then cooled to about 45° C., and while maintaining the temperature at about 45° C. the mass is agitated for about 2 hours. The mass is then cooled to about room temperature and then poured into approximately 300 parts by weight of ice water. This mixture is then filtered and the filter cake dried. The dried filter cake is recrystallized from water to give 3-nitro-5-chlorosalicylic acid, a yellow crystalline solid melting at 165–167° C.;

(c) 3 - iodo - 2',5 - dichloro-4'-nitrosalicylanilide.— An orange solid melting above 300° C. prepared by adding to a suitable reaction vessel equipped with a thermometer, agitator and reflux condenser 3 parts by weight of 3-iodo-5-chlorosalicylic acid, approximately 60 parts by weight of chlorobenzene and 1.7 parts by weight of 2-chloro-4-nitroaniline. The so charged mass is heated up to about 65° C. and while agitating 0.41 part by weight of phosphorus trichloride in admixture with approximately 7 parts by weight of chlorobenzene is slowly added. Upon completion of the phosphorus trichloride addition the mass is refluxed for about 8 hours. The mass is then cooled to room temperature and filtered. The filtrate is subjected to vacuum distillation to remove the chlorobenzene and other volatiles. This solid residue of the vacuum distillation and the filter cake are combined, washed with dilute aqueous sodium bicarbonate solution and then with water. The so-washed solid is then recrystallized from an ethanol-water mixture to give 3-iodo-2',5-dichloro-4-nitrosalicylanilide;

(d) 3-bromo-3',4',5 - trichlorosalicylanilide.—A colorless solid melting at 159–160° C., prepared in accordance with the same procedure of the aforedescribed example for preparing the salicylanilide of this invention but replacing 3-iodo-5-chlorosalicylic acid with an equimolecular proportion of 3-bromo-5-chlorosalicylic acid. This 3-bromo-5-chlorosalicylic acid precursor, a light brown solid melting at 237–238° C., is prepared by adding to a suitable reaction vessel equipped with a thermometer, agitator and reflux condenser 34.4 parts by weight of 5-chlorosalicylic acid and approximately 200 parts by weight of glacial acetic acid and the mass heated to about 50° C. While agitating this mass there is added 33.5 parts by weight of elemental bromine in approximately 50 parts by weight of glacial acetic acid over a period of about 30 minutes. Upon completion of this addition the temperature rose to about 100° C. The mass is then heated to about 120° C. and maintained at that temperature for about 4 hours. Thereupon the mass is poured into a 2% aqueous sodium sulfite solution. This mass is cooled to about 15° C. and then filtered, and the filter cake dried. The so dried filter cake upon recrystallization from glacial acetic acid gave 3-bromo-5-chlorosalicylic acid, a brown solid melting at 237–238° C.

To illustrate the activity against southern armyworm larvae of the salicylanilide of this invention as compared to the salicylanilides of foregoing paragraphs (a), (b), (c) and (d) is the following:

A primary base solution of the salicylanilide to be evaluated is prepared by dissolving 100 mg. of the compound in 10 ml. of acetone. Then a 1.0 ml. aliquot of this primary base solution is diluted with 9 ml. of acetone to provide a solution containing 1.0 microgram per microliter of the compound to be evaluated. This latter solution is transferred to a 0.25 cc. hypodermic syringe which syringe is then placed in a topical treatment device calibrated to deliver one microliter per stroke. The applicator lever is pressed several times to make certain no air bubbles are trapped in the needle and the needle is wiped with filter paper to remove any excess solution. The applicator lever is pressed once to deliver one microliter which is applied directly to each of 12 lima bean leaf discs 0.25 inch in diameter. Individual second instar southern armyworm larvae (*Prodenia eridania*) are placed beside each disc and the disc and larvae encaged with a plastic cap 0.875 inch in diameter. Two replicates were included for each salicylanilide. After 48 hours at room temperature mortality observations are made. The average percent mortality for each salicylanilide was found to be as follows:

| Salicylanilide: | Percent kill at 1.0 microgram per larva |
| --- | --- |
| 3-iodo-3',4',5-trichlorosalicylanilide | 100 |
| 3,3',4',5-tetrachlorosalicylanilide | 10 |
| 3-nitro-3',4',5-trichlorosalicylanilide | 0 |
| 3-iodo-2',5-dichloro-4'-nitrosalicylanilide | 0 |
| 3-bromo-3',4',5-trichlorosalicylanilide | 10 |
| Control [1] | 0 |

[1] No salicylanilide.

Although the salicylanilide of this invention is useful per se in destroying southern armyworm larvae, it is preferable that it be supplied to the larvae or to the environment of the larvae in a dispersed form in a suitable extending agent. The exact concentration of the salicylanilide of this invention employed in destroying the said larvae can vary considerably provided the required dosage (i.e. toxic or larvicidal amount) thereof is supplied to the larvae or to the environment of the larvae. When the extending agent is a liquid or mixture of liquids (e.g. as in solutions, suspensions, emulsions, or aerosols) the concentration of the salicylanilide of this invention generally will be in the range of 0.001 to 50 percent by weight. When the extending agent is a semi-solid or solid, the concentration of the salicylanilide of this invention generally will be in the range of 0.1 to 25 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared larvicidal spray or particulate solid. In such a concentrate composition, the salicylanilide generally will be present in a concentration of 5 to 95 percent by weight, the residue being any one or more of the well known pesticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsion of the salicylanilide of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When the salicylanilide of this invention is to be supplied to the larvae or to the environment of the larvae as aerosols, it is convenient to dissolve it in a suitable solvent and disperse the resulting solution in dichlorodifluoromethene or like chlorofluoroalkane which boils below room temperature at atmospheric pressure.

The salicylanilide of this invention is preferably supplied to the larvae or to the environment of the larvae in the form of emulsions or suspensions. Emulsions or suspensions are prepared by dispersing the salicylanilide of this invention either per se or in the form of an organic solution thereof in water with the aid of a water-soluble nonionic surfacant. The term "surfactant" as employed here and in the appended claim is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compound of this invention in order to secure better wetting and spreading of the active ingredient in the water vehicle or carrier in which it is insoluble through lowering the surface tension of the water (see also Frear "Chemistry of Insecticides, Fungicides and Herbicides," second edition, page 280). The surfactants contemplated are the well-known capillary active substances which are non-ionic and which are described in detail in volumes I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water soluble non-ionic surface active agents set forth in U.S. 2,846,398 (issued Aug. 5, 1958).

The salicylanilide of this invention can be dispersed by suitable methods (e.g. tumbling or grinding) in solid extending agents either of organic or inorganic nature and supplied to the larvae environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for larvicidal purposes in the dry form, or by addition of water-soluble non-ionic surfactants the dry particulate solids can be rendered wettable by water so as to obtain stable aqueous dispersions or suspensions suitable for use as sprays.

For special purposes the salicylanilide of this invention can be dispersed in a semi-solid extending agent such as petrolatum with or without the aid of solubility promoters and/or surfactants.

In all of the forms described above the dispersions can be provided ready for use in combatting southern armyworm larvae or it can be provided in a concentrated form suitable for mixing with or dispersing in other extending agents. As illustrative of a particularly useful concentrate is an intimate mixture of the salicylanilide of this invention with a water-soluble non-ionic surfactant which lowers the surface tension of water in the weight proportions of 0.1 to 15 parts of surfactant with sufficient of the salicylanilide of this invention to make 100 parts by weight. Such a concentrate is particularly adapted to be made into a spray for controlling southern armyworm larvae by the addition of water thereto. As illustrative of such a concentrate is an intimate mixture of 20 parts by weight of 3-iodo-3′,4′,5-trichlorosalicylanilide and 2 to 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting the said larvae is a solution (preferably as concentrated as possible) of a salicylanilide of this invention in an organic solvent therefor. The said liquid concentrate preferably contains dissolved therein a minor amount (e.g. 0.5 to 10 percent by weight of the weight of the new larvicidal agent) of a non-ionic surfactant, which surfactant is also water-soluble. As illustrative of such a concentrate is a solution of 3-iodo-3′,4′,5-trichlorosalicylanilide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions described hereinbefore for larvicidal purposes, the salicylanilide of this invention can also be advantageously employed in combination with other pesticides, including, for example, other larvicides, bactericides, fungicides, and herbicides. In this manner it is possible to obtain mixtures which are effective against a wide variety of pests and other forms of noxious life.

In the destruction of southern armyworm larvae the salicylanilide of this invention either per se or compositions comprising same are supplied to the larvae or to their environment or habitat in a toxic or larvicidal amount. This can be done by dispersing the new larvicidal agent or larvicidal composition comprising same in, on or over an infested environment or in, on or over an environment the larvae frequent, e.g. agricultural crops or soil or other growth media or other media attractable to the larvae for habitational or sustenance purposes, in any conventional fashion which permits the larvae to be subject to the larvicidal action of the salicylanilide of this invention. Such dispersing can be brought about by applying sprays or particulate solid compositions to a surface infested with the larvae or attractable to the larvae, as for example, the surface of an agricultural soil or other habitat media such as the above ground surface of host plants by any of the conventional methods, e.g. power dusters, boom and hand sprayers, and spray dusters. Also for sub-surface application such dispersing can be carried out by simply mixing the new larvicidal agent per se or larvicidal spray or particulate solid compositions comprising same with the infested environment or with the environment the larvae frequent, or by employing a liquid carrier for the new larvicidal agent to accomplish sub-surface penetration and impregnation therein.

What is claimed is:
1. A method of controlling *Prodenia eridania* which comprises applying to the larvae thereof a toxic amount of 3-iodo-3′,4′,5-trichlorosalicylanilide.

References Cited

UNITED STATES PATENTS 3,113,067  12/1963  Schranfstatter _____ 260—559

ALBERT T. MEYERS, Primary Examiner

A. J. ROBINSON, Assistant Examiner